United States Patent

[11] 3,609,692

[72] Inventors Robert M. Blake
Wappingers Falls;
Robert P. Dingwall, Mahopac, both of N.Y.
[21] Appl. No. 769,654
[22] Filed Oct. 22, 1968
[45] Patented Sept. 28, 1971
[73] Assignee International Business Machines Corporation
Armonk, N.Y.

[54] COMMUNICATIONS MONITOR FOR DATA PROCESSING SYSTEM
5 Claims, 3 Drawing Figs.

[52] U.S. Cl. .......... 340/152, 340/147, 340/153
[51] Int. Cl. .......... H04q 5/00
[50] Field of Search .......... 340/152

[56] References Cited
UNITED STATES PATENTS

| | | | |
|---|---|---|---|
| 3,308,238 | 3/1967 | Brothman | 340/152 |
| 3,314,051 | 4/1967 | Willcox | 340/152 X |
| 3,344,401 | 9/1967 | MacDonald | 340/152 X |
| 3,359,541 | 12/1967 | Hunkins | 340/152 |
| 3,377,619 | 4/1968 | Marsh | 340/152 X |
| 3,508,002 | 4/1970 | Haver | 340/152 X |

*Primary Examiner*—Harold I. Pitts
*Attorneys*—Hanifin and Jancin and Isidore Match

ABSTRACT: A monitoring arrangement for enabling communication between a data processing system and remote users thereof in which there are included means for enabling communication between an operator and the system to permit examination of the data being sent by the system, means for enabling communication between remote users and the system to permit examination of the data being sent by the users to the system and means for alternately consecutively enabling the system information and the user information to be observed to effectively achieve bidirectional intercommunication between the system and the users. The arrangement is capable of operating in both the audio and digital modes.

INVENTORS
ROBERT M. BLAKE
ROBERT P. DINGWALL

BY Isidore Match

ATTORNEY

COMMUNICATIONS MONITOR FOR DATA PROCESSING SYSTEM

BACKGROUND OF THE INVENTION

This invention relates to monitoring arrangements for data processing systems. More particularly, it relates to an improved monitoring arrangement which is advantageously useful in teleprocessing data processing systems.

In teleprocessing systems, time-shared or otherwise, users operating a computer from a remote location experience difficulty in obtaining aid in the event that a problem arises and, if a system failure occurs, it is correspondingly difficult to notify the users thereof. In addition, schedules and other pertinent information may vary on a day-to-day basis. Such schedules and information variation should be updated on a continuing basis and relayed to the users as soon as possible.

A computer operator of a teleprocessing system also encounters many problems. For example, he cannot conveniently contact users of a system if a problem develops nor can he conveniently aid a remote user-novice with his system usage problems. The operator has to be alerted immediately when a system problem occurs so that he may take necessary action and to be able to respond to requests from a user.

Accordingly, it is an important object of this invention to provide a monitoring arrangement for a data processing system which permits an operator to aid a user by monitoring the user's data line and by interrupting the user and/or his program.

It is a further object to provide a monitoring arrangement for a data processing system wherein prerecorded failure and scheduling information can be transmitted to the user either under operator or automatic control.

It is another object to provide a monitoring arrangement for a data processing system wherein an operator can monitor incoming and outgoing information on data lines without disturbing users or their programs.

It is still a further object to provide a monitoring arrangement wherein an operator can interrupt a data line and correspond with a user.

SUMMARY OF THE INVENTION

Generally speaking and in accordance with the invention, there is provided an arrangement for enabling communication between a data processing system and remote users thereof wherein each of the users is coupled to the system in an associated channel. The system comprises means for enabling respective observations of information sent from the system to the users in the channels, means for enabling respective observations of information sent from the users to the system in the channels, and means for alternatively consecutively enabling the aforementioned system and user information to be observed to effectively achieve bidirectional communication between the systems and the users.

The foregoing and other objects, features and advantages of the invention will be apparent from the following more particular description of a preferred embodiment of the invention, as illustrated in the accompanying drawings.

BRIEF DESCRIPTION OF THE DRAWINGS

In the drawings, FIGS. 1A and 1B, taken together as in FIG. 1, constitute a block diagram of an illustrative embodiment of a monitoring arrangement constructed in accordance with the principles of the invention.

DESCRIPTION OF A PREFERRED EMBODIMENT

Figures 1, 1A:
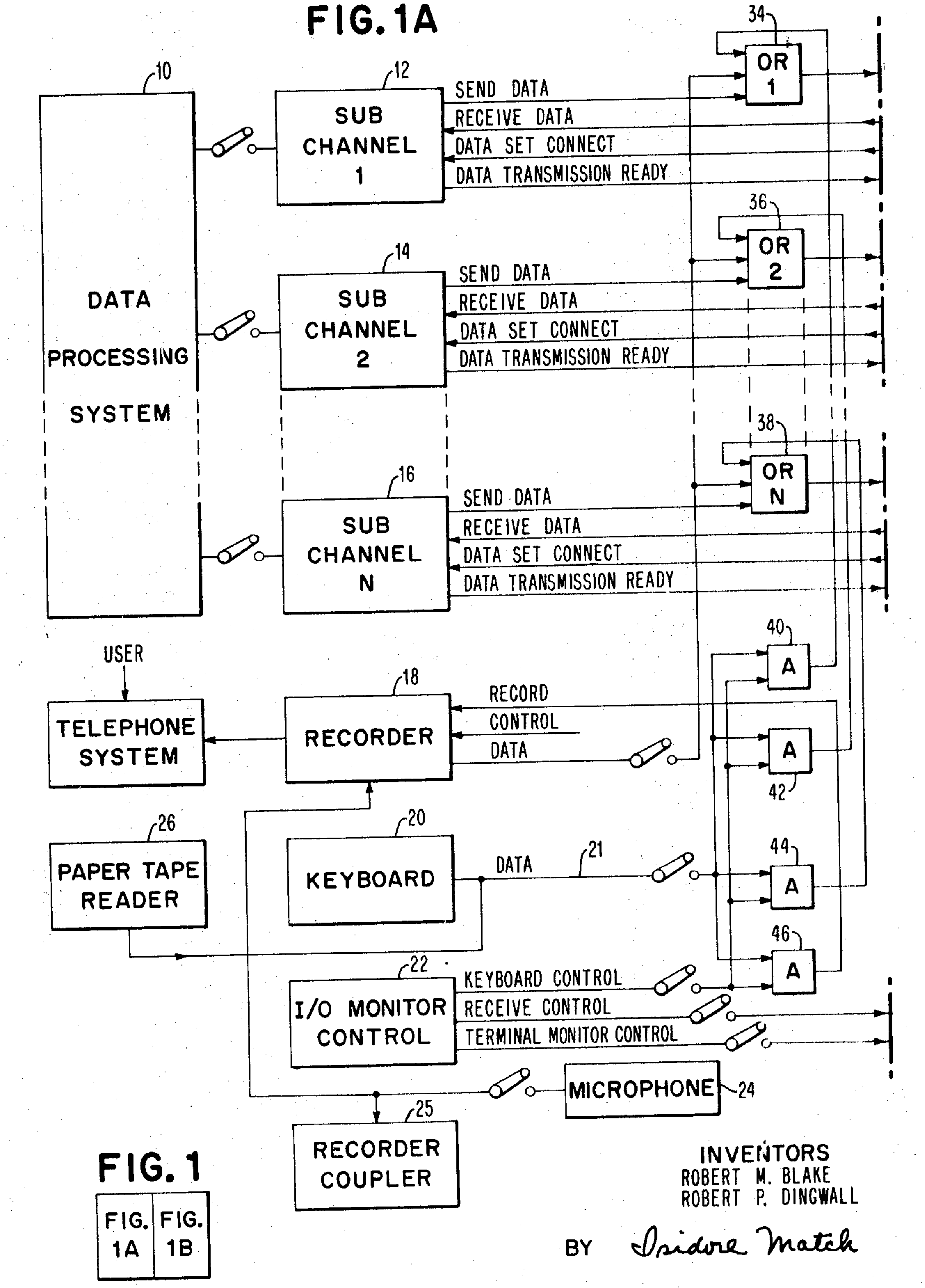
Figure 1B:
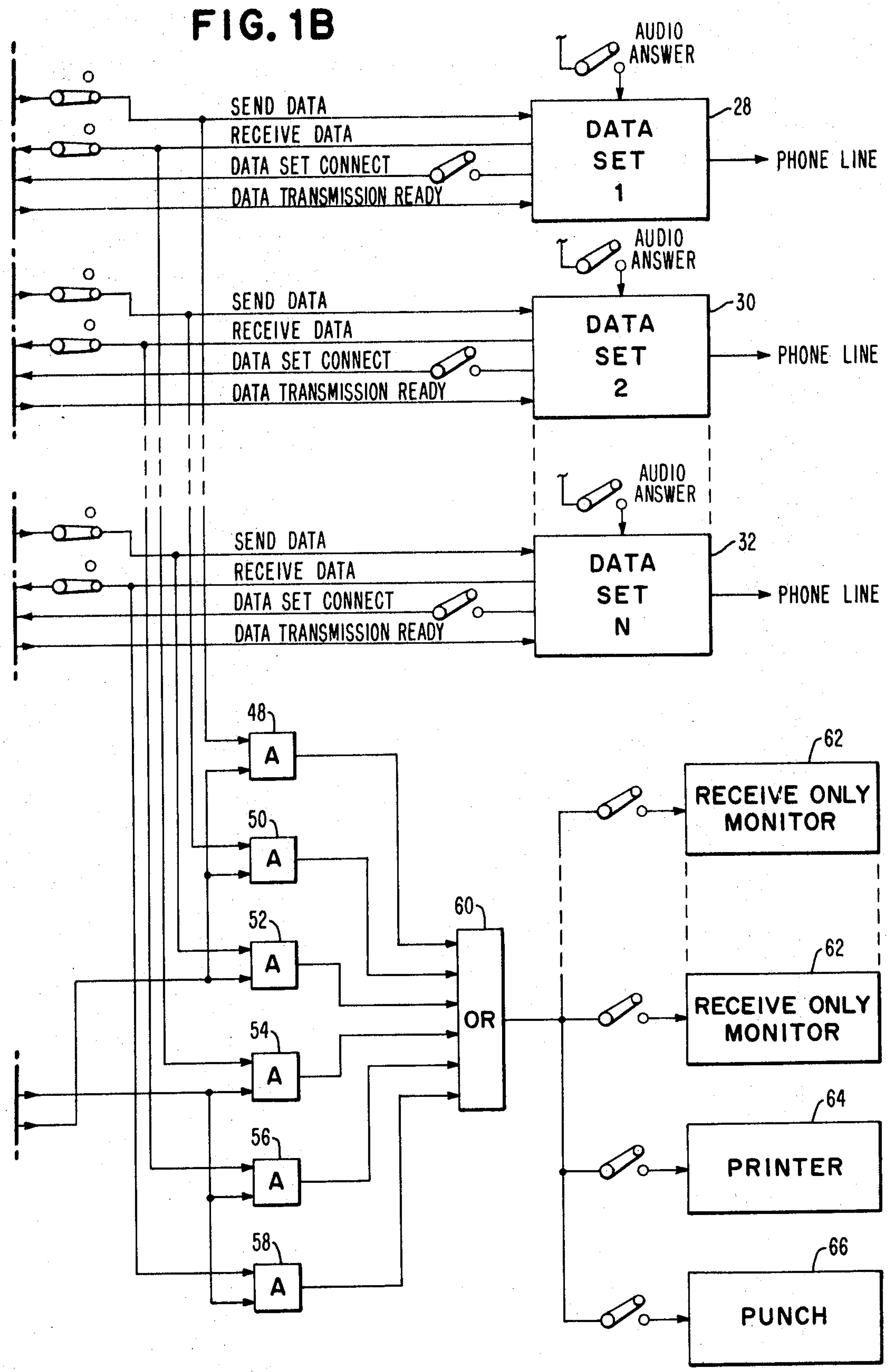

Referring now to FIGS. 1, 1A and 1B, the data processing system 10 shown therein may suitably represent a teleprocessing system which is operated by users from a remote location. Associated with system 10 are a plurality of subchannels 1–N and designated in FIG. 1 by the numerals 12, 14 and 16, these subchannels suitably being multiplexor channels. From each channel, there originates a "send data" line and a "data transmission ready line," and terminating in each subchannel are a "receive date" line and a "data set connect" line. The significance of these lines is explained hereinbelow. The data transmission ready line is operative to indicate that a connection has been made to the system, i.e., someone has dialed in or turned on the power in the case of a leased line, etc.

In the monitoring arrangement according to the invention, there are included a recorder 18 which may suitably be a dictation machine of the belt type, such as the "Executary" manufactured by the International Business Machines Corporation. The belts for such machine may suitably be subdivided into a plurality of tracks to place digital or audio information thereon. There are further included in the system a keyboard which may suitably be one such as the 1052 typewriter and a paper tape reader 20 such as the 1054 reader, both of the latter devices also being manufactured by the International Business Machines Corporation. The stage 22, legended "I/O monitor control," which is continually polling the system under the inspection of the operator, provides the control signals for the arrangement and may suitably contain an alarm (not shown), such as an audio prompting alarm which automatically alerts the operator.

Into recorder stage 18, there enter three lines, viz: a record line to receive information from keyboard stage 20, a control line, and a line from a microphone 24, which enables direct audio recording in recorder 18. A data line originates at the output of a data set. The recorder coupler stage 25 is used to obtain information from the audio channel of the random access recorder 18. The user may call a special extension and receive system status information. A touch tone decoder is suitably included to enable the user to select the desired information track. The coupler may suitably be a data set.

A paper tape reader 26, which may suitably be a 1054 paper tape reader manufactured by the International Business Machines Corporation, and keyboard 20 provide output information therefrom on a common line 21.

I/O monitor control stage 22 has three output lines, viz a keyboard control, a receive control and terminal monitor control line.

For the subchannels, there are provided a corresponding number of data set stages 1–N, the latter stages being designated in FIG. 1 by the numerals 28, 30 and 32. The data sets are known devices for preparing digital data for transmission over telephone lines and may be of the frequency shift keying type. At each data set, there originates the receive data and data set connect lines and there terminates at each data set the send data and data transmission ready lines.

To enable an individual to operate the monitor arrangement, there may suitably be provided a control panel for providing the necessary electrical signals to effect the different operations of the arrangement. Suitably, in this arrangement, there would be provided keyboard control buttons, and recorder control buttons, subchannel selection buttons to enable the operator to determine which channel is to be monitored. As an aid to understanding the invention, appropriate switches have been included in the drawing to indicate the operation of the selection buttons.

In considering the remaining circuitry shown in FIG. 1, which in essence comprises the logic of the monitoring arrangement in accordance with the invention, an OR circuit is provided for each subchannel, the latter OR circuits being respective designated with the numerals 34, 36 and 38 respectively. There are also provided in this logic, four AND circuits designated with the numerals 40, 42, 44 and 46 respectively and six AND circuits designated with the numerals 48, 50, 52, 54, 56 and 58 respectively. The outputs of AND circuits 48, 50, 52, 54, 56 and 58 are all applied as inputs to an OR circuit 60, the output of OR circuit 60 being applied to a receive only monitors stage 62, a printer stage 64, and a punch stage 66, as is further explained hereinbelow.

The data output from either paper tape reader 26 or keyboard 20 is applied as an input to AND circuits 40, 42, 44 and 46. The other input to AND circuits 40, 42, 44 and 46 is the keyboard control output signal from I/O monitor control 22. The output of AND circuits 40, 42 and 44 are applied as inputs to OR circuits 34, 36 and 38 respectively. The other inputs to each of OR circuits 34, 36 and 38 are the send data lines from the associated subchannels and the data line from recorder 18.

One of the inputs to each of AND circuits 48, 50 and 52 is the respective output of OR circuits 34, 36 and 38. The other inputs to AND circuits 48, 50 and 52 is the receive control signal output from I/O monitor control 22. One of the inputs to each of AND circuits 54, 56 and 58 is the output appearing on the receive data lines respectively. The other input to AND circuits 54, 56 and 58 is the terminal monitor control signal output of I/O monitor control stage 22. The outputs of AND circuits 48, 50, 52, 54, 56 and 58 are all applied as inputs to OR circuit 60, the output of OR circuit 60 being applied to actuate receive only monitors 62 which may be a plurality of terminals, such as cathode ray display tubes, a printer 64 and a paper tape punch 66.

In considering the operation of the arrangement shown in FIG. 1, it is first explained in connection with the control of keyboard 20 or paper tape reader 26. The arrangement permits three types of operation in the keyboard control condition, viz: (1) Receive System, (2) Receiver User, and (3) monitor.

In the receive mode of the keyboard control operation, the operator selects the channel from the control panel to close the appropriate switch. In addition, from the control panel he closes the switch in the terminal monitor control output line. In this manner, he actuates one of AND circuits 48, 50 or 52 depending upon the channel that he has selected. Since one of the inputs to a particular AND circuit 48, 50 or 52 is the send data line of a corresponding channel, the information appearing on such send data line will appear at the output of OR circuit 60 and will appear on a receive only monitor terminal 62. In this manner, the operator can monitor the information sent from the monitoring arrangement. The information appearing on the send data line results from the enabling of the appropriate AND circuit 40, 42 or 44, such latter circuits being enabled by the keyboard control signal output from I/O monitor 22 and the output appearing on data line 21. The output of the particular AND circuit 40, 42 or 44, which is enabled, is passed through the corresponding OR circuit 34, 36, 38 to activate the proper send data line. The information on data line 21 can either be a prerecorded message read from a prepared paper tape in reader 26 or can be a message typed on keyboard 20. It is thus appreciated that in this mode of operation, information is presented on a receive only monitor terminal 62, since the operator can select such terminal from a control panel by closing the appropriate switch.

In the receiver user mode, the AND circuits 54, 56 and 58 are utilized. As is seen, one of the inputs to each of these AND circuits is the output appearing on the receive data line for the particular subchannel which is selected. The other input to AND circuits 54, 56 and 58 is the receive control signal from I/O monitor control 22. When one of AND circuits 54, 56 or 58 is enabled in this mode, the information entered by the user will appear at the selected one of receive only monitors 62.

In the monitor both phase, there is enabled the viewing of a bidirectional conversation between the user and the computer which appears on printer 64. In such situation, the operator at the control panel can effect the closing of the switch to the printer and the opening of the switches on the send data and receive data lines. In this manner, he locks out either the user or the system. Thereafter, by entering into the receive system mode, he can communicate with system or, by entering into the receiver user mode, he can communicate with the user, In this manner, the operator can effect conversation between the system or the user on printer 64 and keyboard 20. The operator can also close the switch via the control panel to punch 66 so that all of the material appearing on a receive only monitor 62 and/or printer 64 will be punched on paper tape.

In the recorder control phase, operation can be effected in accordance with the invention in either the digital or audio mode or a combination of both. The recorder serves as an information source for the user concerning the current status of the system. Once messages have been recorded, the operator need only select the desired message by using appropriate track select switches. An audio recording is made available to the user through a conventional telephone system and audio messages can be directly recorded by the operator by means of a microphone 24.

When using the recorder, two digital modes of operation are possible, the selected mode having to be selected by the operator. A closing of an appropriate audio answer switch enables the corresponding data set. When the user dials the extension number connected with the system, he receives a typed response on his terminal.

In this operation, the operator chooses the track on the belt on which he is to record by choosing appropriate combinations of track select switches and a track select switch. He also decides on the recording mode, i.e., digital or audio.

If digital recording is decided upon, he closes the keyboard switch and actuates recorder 18. In this situation, the active data line 21 and the keyboard control signal from I/O monitor 22 enables AND circuit 46 whereby the digital information appearing on data line 21 is recorded on the selected track in recorder 18. Such information appears on the output data line of recorder 18 when a user calls for it and appears through OR circuit 34 as an input to the appropriate data set.

If audio recording is desired, keyboard 20 is switched out, an audio record switch is closed and then the operator can record on a selected track with the use of microphone 24 as if he were using a standard microphone.

With the use of appropriate switches and indicators, a recording can be made which contains both audio and digital information. In such mode of operation, keyboard 20 is actuated whereby information on data line 21 will be placed on a selected track in digital form. At a chosen time, digital recording will cease as indicated to the operator, at which point control is turned over to the operator through microphone 24. The operator can then record information on the remainder of the selected track.

The data transmission/ready lines associated with each channel function to indicate to the data set that the computer is ready to send data.

The control input to recorder 18 indicates the output of suitable devices, such as track selector switches, track stepping relays, record, etc., for enabling the selection of given tracks on the belt by the operator for recording thereon.

In accordance with the invention, a switch may be further provided to activate all of the data sets and transmit prerecorded messages to anyone connecting to the system. This switch is employed when a system is incapable of responding.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An arrangement for enabling communication between a data processing system and remote users thereof wherein each of said users is coupled to said system in an associated channel comprising:

system observing means for enabling respective observations of information sent from said system to said users through said channels, said system observing means comprising means for generating a system observing control signal, and means responsive to the concurrence of said system observing control signal and the information form said system for making said last-named information available for examination;

user observing means for enabling respective observations of information sent from said users to said systems through said channels, said user observing means comprising means for generating a user observing control signal means responsive to the concurrence of said user observing control signal and the information from a user for making said last-named information available for examination;

intercommunication means for alternately consecutively enabling said system information and said user information to be observed to effectively achieve bidirectional intercommunication between said system and said users, said intercommunication means comprising means for locking out said system, means for locking out a chosen user, and means responsive to said system and user observing means for respectively recording the system and user information depending upon whether said system or said user is locked out; and means for providing information concerning said system to said users, said information providing means including a recorder capable of having placed thereon both digital and audio information, a typewriter for producing digital information, and a paper tape reader for producing digital information from a punched paper tape read therein.

2. An arrangement as defined in claim 1 and further including means for visually displaying the information made available by said system observing, user observing and intercommunications means.

3. An arrangement as defined in claim 2 wherein said recording means is an output printer.

4. An arrangement as defined in claim 3 and further including a paper tape punch for digitally recording said made available information.

5. An arrangement as defined in claim 1 and further including data set means for enabling digital information to be sent to and from said users.